L. J. CLARK.
CONFECTIONER'S OVEN.
APPLICATION FILED FEB. 21, 1913.
1,117,326.
Patented Nov. 17, 1914.
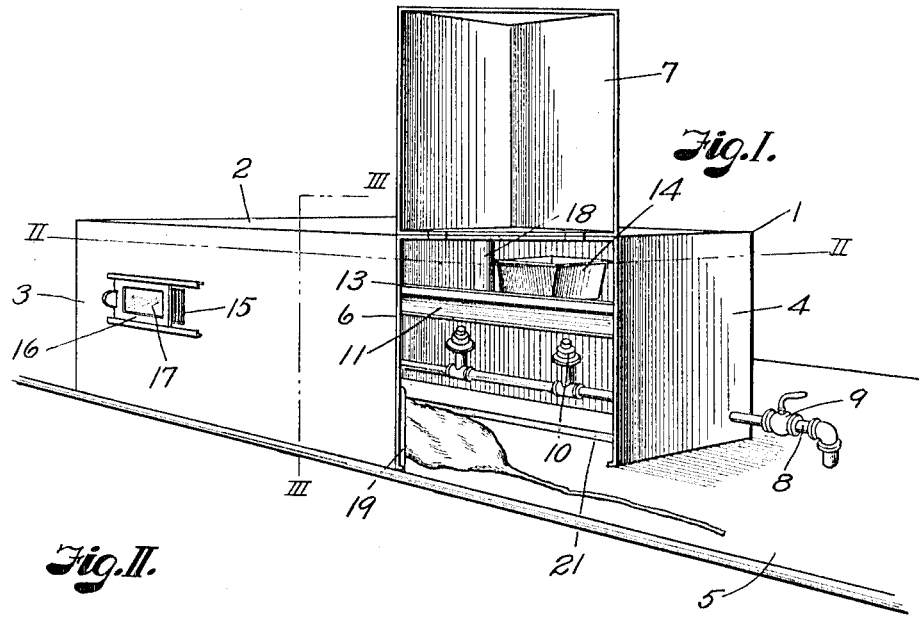
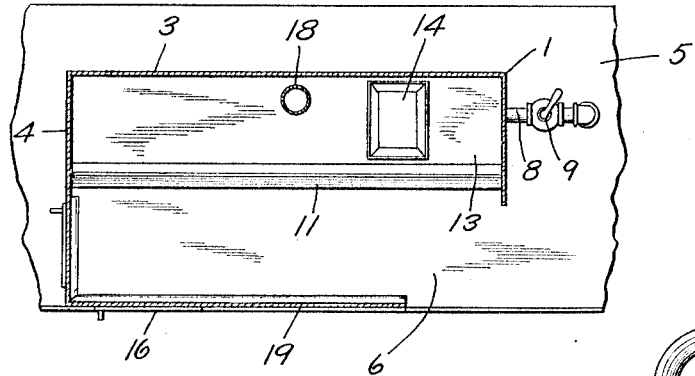
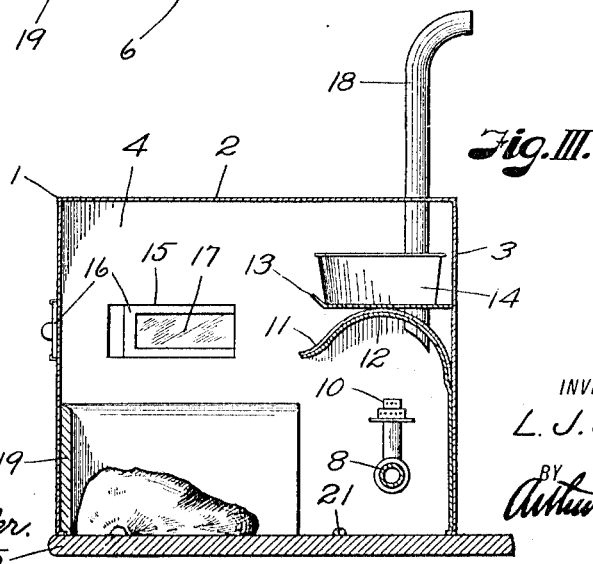
WITNESSES:
Arthur W. Capo.
Lewis L. Miller.
INVENTOR
L. J. Clark.
BY
ATTORNEY

UNITED STATES PATENT OFFICE.

LEONARD J. CLARK, OF KANSAS CITY, MISSOURI.

CONFECTIONER'S OVEN.

1,117,326.  Specification of Letters Patent.  Patented Nov. 17, 1914.

Application filed February 21, 1913. Serial No. 749,995.

*To all whom it may concern:*

Be it known that I, LEONARD J. CLARK, a citizen of the United States, residing at Kansas City, in the county of Jackson and State of Missouri, have invented certain new and useful Improvements in Confectioners' Ovens; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to confectioners' ovens, and more particularly to a device of that type for conditioning candy for spinning, the principal object of the invention being to provide an oven wherein heat may be distributed so as to maintain a batch of candy in working condition while being spun therefrom.

In accomplishing this object I have provided the improved details of structure hereinafter described and illustrated in the accompanying drawings, wherein:—

Figure I is a perspective view of an oven constructed in accordance with my invention, the door being raised to show the interior arrangement. Fig. II is a horizontal section on the line II—II, Fig. I. Fig. III is a transverse sectional view on the line III—III, Fig. I.

Referring more in detail to the parts:—

1 designates the oven casing, which preferably comprises a rectangular sheet metal body, having a top 2, sides 3, and ends 4, and which is secured to a candy maker's table 5 in such a manner that the table forms the bottom of the oven, an opening 6 being cut diagonally from one corner of the casing and provided with a hinged door 7.

Extending through one of the ends of the casing is a fuel supply pipe 8, having an exterior valve 9, and having a plurality of burners 10 located within the oven and beneath a curved deflector 11 which is preferably extended longitudinally throughout the length of the oven, and provided with an asbestos lining 12, one edge of the deflector being run down along one side of the casing and the other provided with a curved lip beneath which heat from the burners is directed downwardly toward the opposite side of the oven.

Located above the deflector is a shelf 13 for supporting pans 14 within which batches of candy material may be kept warm and soft for spinning.

In one side and adjacent end of the oven are apertures 15, having slidable and preferably transparent windows 16, through which the condition of the candy may be observed and whereby ventilation may be afforded, a flue 18 being extended through the top of the oven, and through the shelf 13 and deflector 12, for the purpose of carrying off gases or products of combustion from the burners, in order that air in the oven may be kept pure.

The lower portion of the front side and the rear end of the oven has a wooden lining 19 which prevents the candy from coming in contact with the oven casing and sticking to the metal of which the casing is composed, and a strip 21 is secured to the table in front of the burners to prevent drippings from the latter coming in contact with the candy.

In using the device, pans containing candy material are placed on shelf 13, the burners 10 lighted and the door 7 and ventilators 16 closed so that the candy material may be warmed and softened preparatory to working. When the material is in proper condition it is emptied from the pans onto the part of the table within the oven, within the range of heat from the deflector, where it is further and uniformly warmed and softened into condition for spinning, the condition of the material being observed through the transparent panels 17 of windows 16. When the batch has become uniformly heated, and is in condition for proper working, the operator raises the door to the position shown in Fig. I and spins the candy into the desired shape, the main portion of the batch remaining within the oven while that portion which is being spun lies in the opening 6 and in position to receive heat directly from the deflector.

By having the lining made of wood, its surface may be smoothed so that the candy will not stick thereto, and by having the lining removable it may be taken out of the oven and cleaned when necessary.

By having the opening in the corner of the casing an operator may reach into the oven to handle the candy material, or remove the pans from the warming shelf, without danger of being burned by flame from the heater.

Having thus described my invention, what I claim as new therein, and desire to secure by Letters-Patent, is:—

Claims:

1. A confectioner's oven comprising a casing, a heater located within the casing, means for deflecting heat downwardly and laterally within the casing, a shelf located above and supported by the deflector, and a flue extending through the shelf and deflector and opening through the top of the casing.

2. A confectioner's oven comprising a casing, having an opening in portions of two of its adjacent sides and having a lining at one side and a heater at its opposite side, and a deflector overlying the heater and adapted for guiding heated air downwardly and laterally toward the lined portion of the casing and toward the opening.

3. A confectioner's oven comprising a casing having an opening in portions of two of its adjacent sides and having a lining at one side and the adjacent end thereof and having ventilating openings above the lining portion, a heater at the side of the case opposite the said lining, and a deflector overhanging the heater and adapted for guiding heated air downwardly and laterally in the direction of said lining and opening.

4. A confectioner's oven comprising a casing having a diagonal opening in one corner and extending to the base thereof and a door hinged to the casing and adapted for closing said opening, a heater at the side of the casing opposite the door, and a deflector adapted for guiding heated air transversely and downwardly within the casing toward the diagonal opening.

5. The combination with a confectioner's table, of an oven comprising a casing seated on the table and having a diagonal opening in one corner extending to the base thereof, a lining arranged at the side of the casing and extending partially throughout the height thereof, a heater at the opposite side of the casing, a deflector for directing heated air transversely and downwardly toward the lined portion of the casing and toward the opening, and a rail on said table extending longitudinally within the casing and adjacent the heater.

6. A confectioner's oven comprising a casing having an opening at one corner, a lining at the side of the oven adjacent the opening and at the end opposite the opening, a heater located within the casing at the side thereof opposite said opening, and means for deflecting heated air in the direction of the lining and opening, for the purpose set forth.

7. The combination with a confectioner's table, of an oven comprising a casing seated on the table and having a diagonal opening in one corner extending downwardly to the table, a heater within the casing opposite the diagonal opening, and a deflector above said heater for directing heated air onto the table.

8. The combination with a confectioner's table, of an oven comprising a casing seated on the table and having a diagonal opening in one corner extending to the base of the casing to expose a portion of the table, a heater within the casing and a deflector above said heater for directing heated air onto that portion of the table exposed by the diagonal opening.

In testimony whereof I affix my signature in presence of two witnesses.

LEONARD J. CLARK.

Witnesses:
LEWIS L. MILLER,
LETA E. COATS.

Copies of this patent may be obtained for five cents each, by addressing the "Commissioner of Patents, Washington, D. C."